Feb. 25, 1930.    A. C. GOUGH    1,748,285
BURNISHING ROLLERS FOR AXLE LATHES
Filed Feb. 13, 1929    2 Sheets-Sheet 1
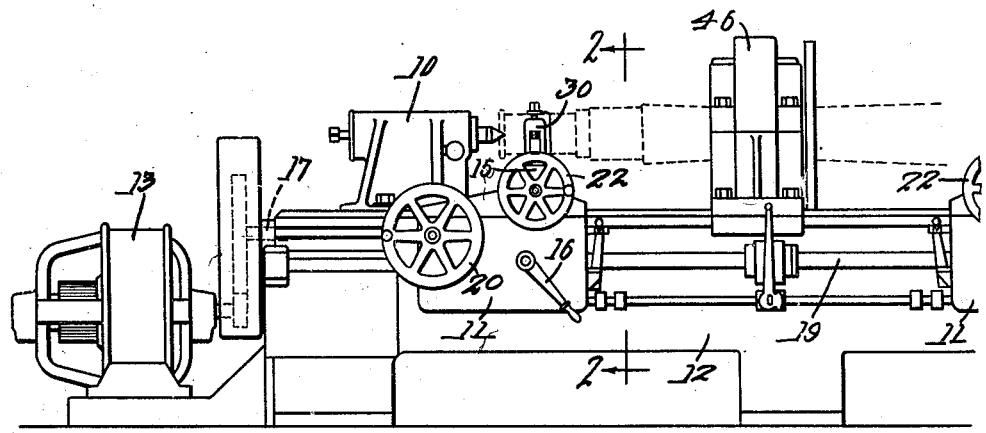
Fig. 1.
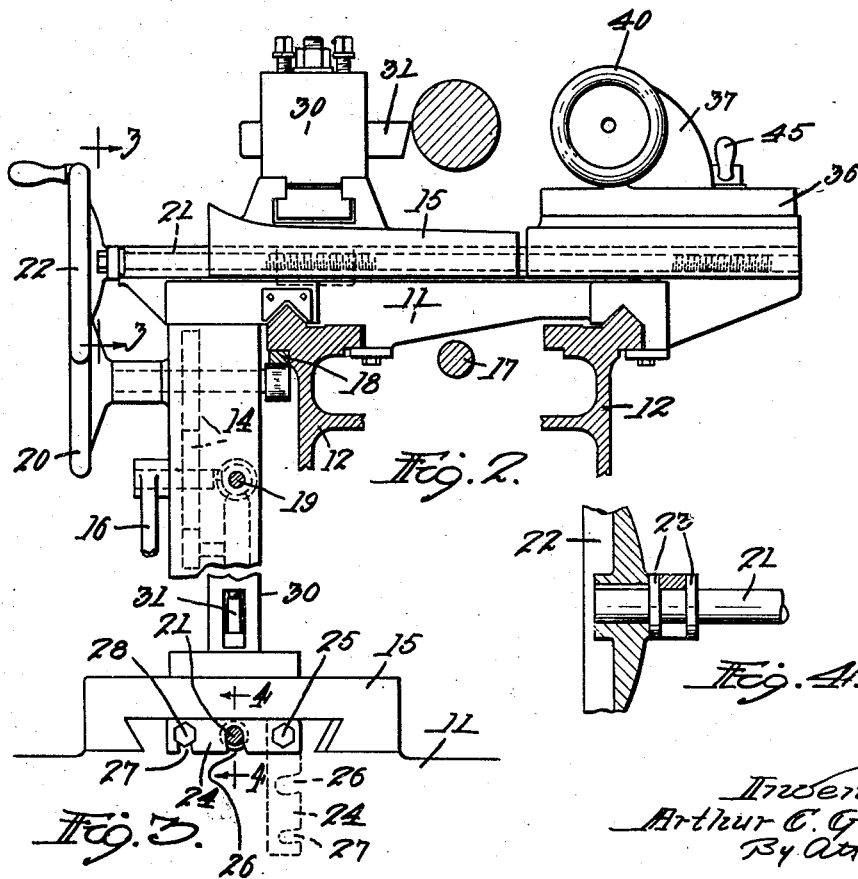
Fig. 2.
Fig. 3.
Fig. 4.
Inventor
Arthur C. Gough
By Attorneys
Southgate Fay & Hanly

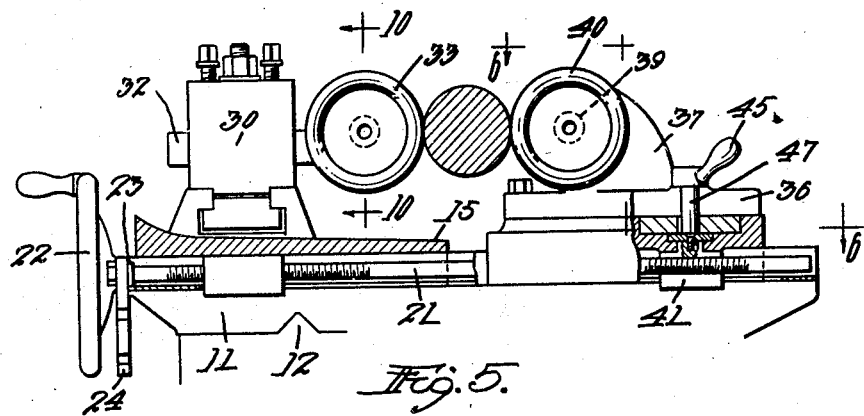
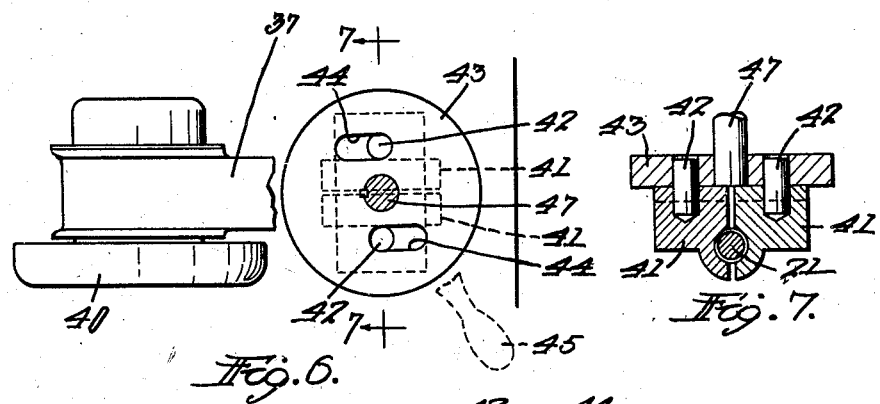
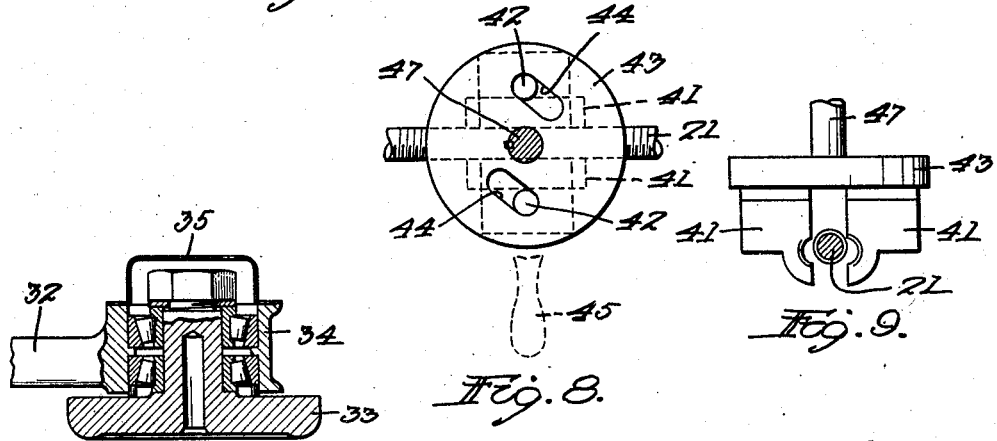

Patented Feb. 25, 1930

1,748,285

UNITED STATES PATENT OFFICE

ARTHUR C. GOUGH, OF FITCHBURG, MASSACHUSETTS, ASSIGNOR TO MANNING, MAXWELL & MOORE, INC., OF NEW YORK, N. Y., A CORPORATION OF DELAWARE

BURNISHING ROLLERS FOR AXLE LATHES

Application filed February 13, 1929. Serial No. 339,670.

The principal objects of this invention are to provide a pair of burnishing rollers, one of which can be located in place of the turning cutter in a convenient manner; to provide a construction in which the rear burnishing roller can be moved back clear of the work and the cutting tool substituted conveniently for the front roller when it is desired to use the machine for turning the axle; to provide a pair of burnishing rollers having a floating support so that they will not impart any pressure to the journal itself to tend to move it out of center; to provide a machine for turning both journals of a car wheel set simultaneously which can be changed over to burnish them, and to provide such a machine in an extremely simple form.

Other objects and advantages of the invention will appear hereinafter.

Reference is to be had to the accompanying drawings in which

Fig. 1 is a side view of one end of an axle turning lathe provided with burnishing rollers in accordance with this invention;

Fig. 2 is a sectional view on the line 2—2 of Fig. 1, showing the machine in the act of turning, with one of the burnishing rollers moved back and the other removed and replaced by a cutting tool;

Fig. 3 is an end view of the tool carriage, showing the arrangement for releasing it so that it will have a floating support;

Fig. 4 is a sectional view on the line 4—4 of Fig. 3;

Fig. 5 is a view like Fig. 2 but with the two burnishing rollers shown in operation;

Fig. 6 is a sectional view on the broken line 6—6 of Fig. 5;

Fig. 7 is a sectional view on the line 7—7 of Fig. 6;

Fig. 8 is a plan of the means for opening and closing the half nuts of the rear roll support for connecting them with the feed;

Fig. 9 is an end view otherwise like Fig. 7 but showing the half nuts separated, and Fig. 10 is a sectional view on the line 10—10 of Fig. 5.

The invention is shown as applied to a car axle turning lathe which comprises two tail stocks 10, only one of which is shown in the drawings, and two carriages 11 mounted on the bed 12. The bed 12 carries large V's on the front and rear on which the carriages slide. The two carriages are designed to carry means for supporting tools for operation on the two journals of the axle at the same time.

The details of the machine, which are already known, will not be described in full and it is sufficient to say that the machine is driven by a motor 13 through a pair of gears to a driving shaft 17 which through gears, not shown, drives a shaft 19. This shaft through worm and gears 14, drives pinions to feed the carriages along racks 18. The gears 14 are provided with a shift mechanism operated by a handle 16 to connect and disconnect the feed. The carriage can be moved back and forth along the machine by means of a hand wheel 20. On each carriage 11 is a front cross slide 15 and a rear one 36, moved laterally back and forth by a cross screw 21. Each screw is provided with a hand wheel 22 for operating the same.

On the cross screw 21 there are two collars 23 fixed a definite distance apart and the hand wheel 22 is keyed on the end of the screw. For a purpose to be described the screw is designed to be set loose so that it remains a floating screw. Normally it is connected with the carriage by means of a swinging plate 24 pivoted on a bolt or stud 25 and having slots 26 and 27 open at one side. One of these slots is to receive the screw 21 when the plate 24 is in the full line position in Fig. 3 and the other is to receive another bolt 28. When in that position the turning of the screw by the hand wheel will operate a nut or the like on the screw to move the same. When the plate 24 is turned out of the way so that it does not engage between the collars 23, as indicated in dotted lines in Fig. 3, the screw is loose and can float back and forth across the machine. This is employed in the burnishing operation only.

On the cross slide 15 is located a tool post 30 which is adapted to receive the shank of a cutting tool 31 or the shank 32 of a burnishing tool 33. This is called the front burnishing roll and it has an integral shank mounted in roller bearings on a casing 34 fixed to the shank 32 and secured by a nut covered by a casing 35. The burnishing roll and the cutting tool can be replaced one for the other.

The rear cross slide 36 has a nut engaging the screw 21 and it is provided with an upwardly extending portion 37 to hold a shaft 39 carrying a rear burnishing roll 40.

In Fig. 5 the machine is set up for burnishing the journals of the wheel set. In this position the plate 24 is swung down as indicated so that the screw 21 is free to move back and forth, so that the two burnishing rolls 33 and 40 are in contact with the opposite sides of the journal at each end and act upon them with the desired degree of pressure. It will be seen therefore that the pressure of each burnishing roll on the axle is equalized and no end thrust is taken by the screw or by the cross slide. The regular feed mechanism of the axle lathe is employed for moving the burnishing rolls along the axle.

When it is desired to stop burnishing and use the machine for its ordinary purpose of truing up the journals with the lathe tools 31, the cross slide 36 is moved back by rotation of the hand wheel 22 until it is clear out of the way, as shown in Fig. 2 and released as described below. The front cross slide 15 is used in the same way as before and the screws on the tool post 30 are loosened up, each shank 32 taken out and the tools 31 put in.

In order to operate the cross slide 36 by the cross screw 21, the cross slide 36 is provided with a pair of half nuts 41 for engaging the screw 21 as shown in Figs. 6 and 7. Each of these nuts is formed of bronze, or lined with it, and they are provided with vertical pins 42. These pins project into a cam plate 43 which has two slots 44 for the pins. This plate is mounted to turn on a stationary vertical stud 47 and has a handle 45 for turning it.

When it is desired to release the cross slide 36 from the screw 21 the handle 45 is turned from the position indicated in Fig. 6 to that indicated in Fig. 8. This carries with it the plate 43 and the slots 44 by their motion move the pins outwardly so that the half nuts 41 move out to the position shown in Fig. 9. Thereafter the turning of the screw 21 to adjust the tool 31 will not affect the position of the cross slide 36 for the rear burnishing roll.

It will be seen that the machine comprises two tail stocks and two carriages mounted on a bed, each carriage having a front and rear cross slide which supports the burnishing rolls and burnishes both journals of the axle at the same time. The tail stocks are adjustable on the bed and are properly aligned and their spindles are independently adjustable. By the use of the flat bearing furnished by the carriage 11 under the front burnishing roll the span of the carriage bridge is reduced.

The drives are as simple as possible. A quick-acting, three jaw, self-centering chuck 46 is furnished. This chuck is provided with a gear which meshes with a gear on the main drive shaft 17 of the machine, thus providing for driving the wheel set directly and also feeding the cutting tool, if desired.

Although I have illustrated and described only one form of the invention I am aware of the fact that modifications can be made therein by any person skilled in the art without departing from the scope of the invention as expressed in the claims.

Therefore, I do not wish to be limited in this respect but what I do claim is:—

1. In a burnishing machine, the combination with a lathe carriage, of means movable with said carriage for mounting a pair of burnishing rolls, one on each side of the work, and means for moving the rear burnishing roll back directly away from the other and clear of the work, the carriage being adapted for carrying a cutting tool in the location of one burnishing roll.

2. In a burnishing machine, the combination with a bed and a carriage mounted thereon, of supports for two burnishing rolls, one on each side of the work, means for adjusting the burnishing roller supports transversely, and means for connecting the adjusting means with the carriage, which can be moved to free the adjusting means from the carriage and allow the two burnishing rolls to float.

3. In a burnishing machine, the combination with a lathe bed and a carriage mounted thereon, of two separate cross slides for two burnishing rollers, one on each side of the work, a cross screw for adjusting the cross slides, movable means for connecting the cross screw with the carriage, whereby said means can be moved to free the screw from the carriage and allow the two burnishing rolls to float to equalize the pressure of the two rolls on the journal.

4. In an axle lathe, the combination with a bed and a carriage movable thereon, of a cross screw having a pair of fixed collars thereon, a movable plate connected with the carriage and having an open slot for engaging the screw between said collars, whereby the screw is fixed lengthwise with respect to the carriage, whereby when said plate is taken out from between the collars the screw will be free to float, a pair of cross slides having screw threads for connecting them with the screw and burnishing rollers carried by said slides and adapted to engage the work on diametrically opposite sides.

In testimony whereof I have hereunto affixed my signature.

ARTHUR C. GOUGH.